United States Patent [19]

Rosenberger

[11] 4,060,732

[45] Nov. 29, 1977

[54] SEPARATING GASEOUS ISOTOPE MIXTURES

[75] Inventor: Dieter Rosenberger, Sauerlach, Germany

[73] Assignee: Siemens Aktiengesellschaft, Berlin & Munich, Germany

[21] Appl. No.: 641,897

[22] Filed: Dec. 18, 1975

[30] Foreign Application Priority Data

Dec. 18, 1974 Germany ............................. 2459989

[51] Int. Cl.² ............................................. H01J 39/34
[52] U.S. Cl. ................................ 250/432 R; 250/284; 250/393; 250/423 P; 331/DIG. 1
[58] Field of Search ............... 250/281, 283, 284, 288, 250/393, 423 R, 423 P, 432; 331/DIG. 1

[56] References Cited

U.S. PATENT DOCUMENTS

| 3,772,519 | 11/1973 | Levy et al. | 250/423 X |
| 3,914,655 | 10/1975 | Dreyfus et al. | 250/423 X |

OTHER PUBLICATIONS

Robinson, Laser Isotope Separation, Paper Presented to N.Y. Academy of Sciences, 4/22/75.

Primary Examiner—Eugene La Roche
Attorney, Agent, or Firm—Hill, Gross, Simpson, Van Santen, Steadman, Chiara & Simpson

[57] ABSTRACT

A process for separating gaseous isotope mixtures having the general molecular composition $X_{n1}^{(1)} X_{n2}^{(2)} \ldots X_{ni}^{(i)}$, where a constituent $X^{(k)}$ can be replaced by an isotope $\overline{X}^{-(k)}$ by irradiation with laser light.

5 Claims, No Drawings

SEPARATING GASEOUS ISOTOPE MIXTURES

BACKGROUND OF THE INVENTION

A method of separating gaseous isotope mixtures by exciting the rotational vibration levels utilizing narrow-band electromagnetic radiation with subsequent separation of the non-excited isotopes by physical or chemical means has already been disclosed in German patent document Auslegeschrift No. 1,296,611. However, here the excitatory radiation for the isotope mixture undergoing separation must be accompanied by additional electromagnetic radiation of wavelength and bandwidth such that the excited isotope molecules become ionized.

Another method of separating isotopes, in particular $U^{235}$ and $U^{238}$, by means of laser radiation, has been disclosed in German patent document DOS No. 1,959,767. Here, however, it is necessary, before injecting the laser light, to raise the reaction mixture to a predetermined temperature, which must be of such level that perceptible reaction just ceases to take place.

BRIEF SUMMARY OF THE INVENTION

There has now been discovered an isotope separation process which avoids the above indicated prior art isotope separation problems and which enables one to use directly and simply light energy.

In accord with the present invention, an isotope separation by selective optical activation of atoms or molecules is always possible whenever a mixture of different isotopes of an element, or molecules built up from different isotopes of such element, are placed into an excited state by injecting into such a mixture radiation energy, with differing resultant respective probabilities of excitation for each type of isotope. Then, commencing from this excited state, a chemical reaction suitable for an isotope separating function may be allowed to take place in a preferential way.

Such a differing probability of excitation only arises if the frequency interval between the absorption lines belonging to different respective isotopes in an isotope mixture is greater than their respective line widths, and also greater than the line width of the exciting radiation. This condition is always satisfied when using laser light for the pumping action (e.g. the exciting radiation).

A primary object of this invention is to provide an arrangement for separating gaseous isotope mixtures of the general molecular composition $X_{n_1}^{(1)}X_{n_2}^{(2)} \ldots X_{n_1}^{(i)}$, by irradiation with laser light, in which arrangement a constituent $X^{(k)}$ can be replaced by isotope $X^{(k)}$.

Other and further aims, objects, purposes, advantages, uses, and the like for the present invention will be apparent to those skilled in the art from the present specification.

EMBODIMENTS DESCRIPTION

In order to achieve isotope separation, for example, between $U^{235}F_6$ and $U^{238}F_6$, through such a mechanism of differing energy absorption levels, it is necessary, within the absorption bands of the mixture, to find a narrow frequency range in which the less frequent molecule absorbs more energy than the more frequent one. When radiation is injected into such a mixture in this frequency range, then, depending upon the absorption difference, after the excited molecules have been separated, a greater or lesser degree of enrichment of one isotope relative to the other occurs in the fraction which has been separated off, as compared with the natural (starting) mixture. This sequence of excitation followed by separation to achieve such an enrichment can be arbitrarily increased by repetition of the process sequence.

In order to make the process economically viable, it is desirable to effect separation of the molecules in a given mixture using as few process stages (or sequences) as possible.

Because the isotopic shift in the vibrational energies is proportional to the relative mass change during isotope exchange, when $U^{238}$ is being exchanged for $U^{235}$, a relatively small shift in the energy level can be expected. On the other hand, the line density within the rotational vibration band, in the case, for example, of $UF_6$, is substantially higher, because of the low rotation constant, the Coriolis splitting of the vibration energy levels, and the cancellation of the so-called K-degeneration, that it is, for example, in light alcohols, or light two-atom and three-atom molecules. There is, therefore, no reason to expect to find an isolated line of the more infrequent molecule within the bands.

In accord with the teachings of this invention, the laser light excitation irradiation is injected either into the top of the bands of the fundamental and combination vibrations, or into the band edges of the electronic transitions executed by the molecules of the isotope mixture undergoing isotope separation. Either a tunable laser should be used as the excitation energy supply, or a laser supplying the excitation energy (the pumping laser) should be followed by a tunable laser (which is preferably continuously tunable).

It has been found that the desired energy transfer is achieved merely by injecting radiation into the band edges. At the band, within a frequency interval which is equivalent to the isotopic shift $\Delta\nu_I$, exclusively lines corresponding to the lighter or lightest molecule (as the case may be) occur.

When within this frequency range, a laser light radiation is injected whose line width is less than $\Delta\nu_I$, then transitions will occur solely in the lighter or lightest molecule. Disregarding thermal excitation phenomena, therefore, in this fashion, selective excitation of a given type of molecule is achieved. In this context, it can be arranged for radiation injection to take place into the top of the bands both of the infra-red active fundamental and combination vibrations of the molecule, and also of the electronic transitions located in the visible or ultraviolet range.

When radiation injection takes place into the infrared vibration bands, then the succeeding tunable laser will advantageously be a spin-flip Raman laser.

The pumping laser producing the excitation energy is preferably a discretely tuned CO-, $CO_2$- laser, or chemical laser with emissions in the infra-red range.

It is preferred to have such a discretely tunable pumping laser be provided with a device for laser gas exchange in order to be able to shift its emission spectrum.

When the short-wave electronic transitions located in the visible or ultra-violet range are excited, then the tunable laser, or a tunable laser following a pumping laser, is advantageously a dyestuff laser.

Using the method of the present invention it is possible through the agency of the well-known spin-flip-Raman effect in cooled InSb to achieve tunable infrared frequencies in the wide laser line range for $\lambda > 5 \, \mu m$.

Particularly significant, where the isotope separation of gaseous reaction mixtures are concerned, are vibrations which are located in the range covered by CO laser radiation (5 μm), and $CO_2$ laser radiation (10 μm). The frequencies of these lasers, in other words, because of the combination of a spin-flip-Raman laser with the laser producing the excitation energy, in accordance with the invention, are tuned within certain limits. The tuning range for one of the rotational vibration lines, for example, with selective excitation of $UF_6$, is in this context wider than the interval between two lines so that the entire tuning range can be continuously covered.

The tuning range of the CO laser is thus between 5.2 and 6.2 μm while that of the $CO_2$ laser is between 9 and 14.6 μm.

By replacement of the $C^{12}O^{16}$ and the $C^{12}O_2^{16}$ molecules in discretely tunable CO and $CO_2$ lasers by the corresponding molecules comprised of the rare isotopes $C^{13}$ and $O^{18}$, the laser wavelengths of the CO laser and $CO_2$ laser can achieve an additional small variation.

Using the present invention, the following absorption transitions can be covered continuously using CO and $CO_2$ laser lines and spin-flip-Raman laser tuning:

| $UF_6$ Vibration mode | Wavelength | Laser |
| --- | --- | --- |
| $3\nu_3$ | 5.2 μm | $C^{12}O^{16}$ |
| $2\nu_1+\nu_2$ | 5.5 μm | " |
| $2\nu_2+\nu_3$ | 6.0 μm | " |
| $2\nu_2+\nu_4$ | 6.8 μm | $C^{13}O^{18}$ |
| $\nu_1+\nu_4$ | 11.8 μm | $C^{12}O_2^{16}$ |
| $\nu_3+\nu_5$ | 12.0 μm | " |
| $\nu_2+\nu_4$ | 14.0 μm | " |
| $\nu_2+\nu_6$ | 14.7 μm | " |

Those skilled in the art will appreciate that other and further embodiments are obvious and within the spirit and scope of this invention from the teachings hereof.

I claim:

1. In an improved process for separating a gaseous isotope mixture having the general molecular composition $X_{n1}^{(1)}X_{n2}^{(2)}$ where a constituent $X^{(k)}$ can be replaced by an isotope, the improvement which comprises injecting laser light excitation irradiation into a location selected from the group consisting of the top and the bands of the fundamental and combination vibrations, and the vibration band edges of the electronic transitions associated with the isotopes comprising said mixture, said excitation irradiation being supplied by a laser source selected from the group consisting of a tunable laser and a pumping laser followed by a secondary tunable laser.

2. The process of claim 1 wherein said secondary tunable laser is a spin-flip-Raman laser when radiation is injected into the infra-red vibration bands.

3. The process of claim 1 wherein said pumping laser is selected from the group consisting of a discretely tuned CO laser, a $CO_2$ laser, a $CO_2$ laser, and a chemical laser emitting in the infra-red spectrum.

4. The process of claim 3 wherein said discretely tuned pumping laser is equipped with a device for laser gas exchange in order to be able to produce spectral shift in the emission spectrum.

5. The process of claim 1, wherein either said tunable laser or said secondary tunable laser is a dyestuff laser when the short-wave electronic transitions are excited and such are located in a spectral region selected from the group consisting of the visible range and the ultraviolet range.

* * * * *